(No Model.) 2 Sheets—Sheet 1.
L. BELL.
REGULATOR FOR DYNAMO ELECTRIC MACHINES.
No. 532,861. Patented Jan. 22, 1895.
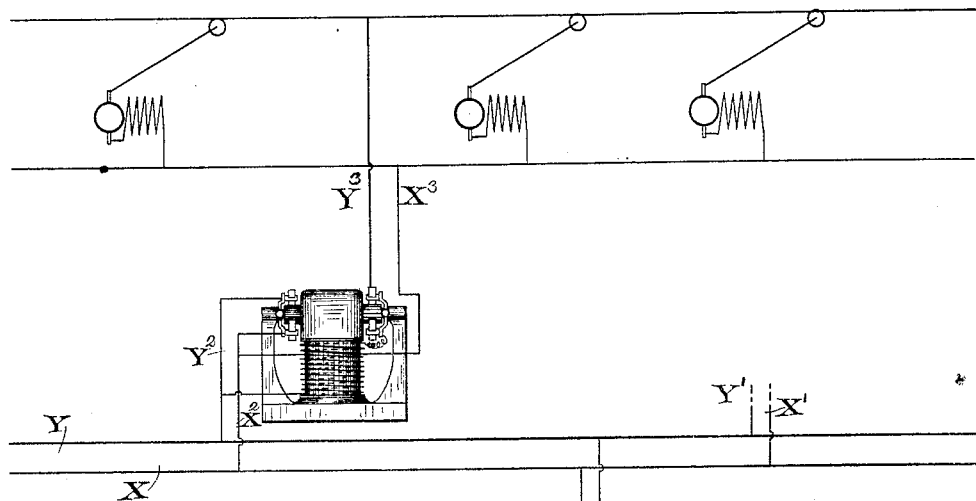
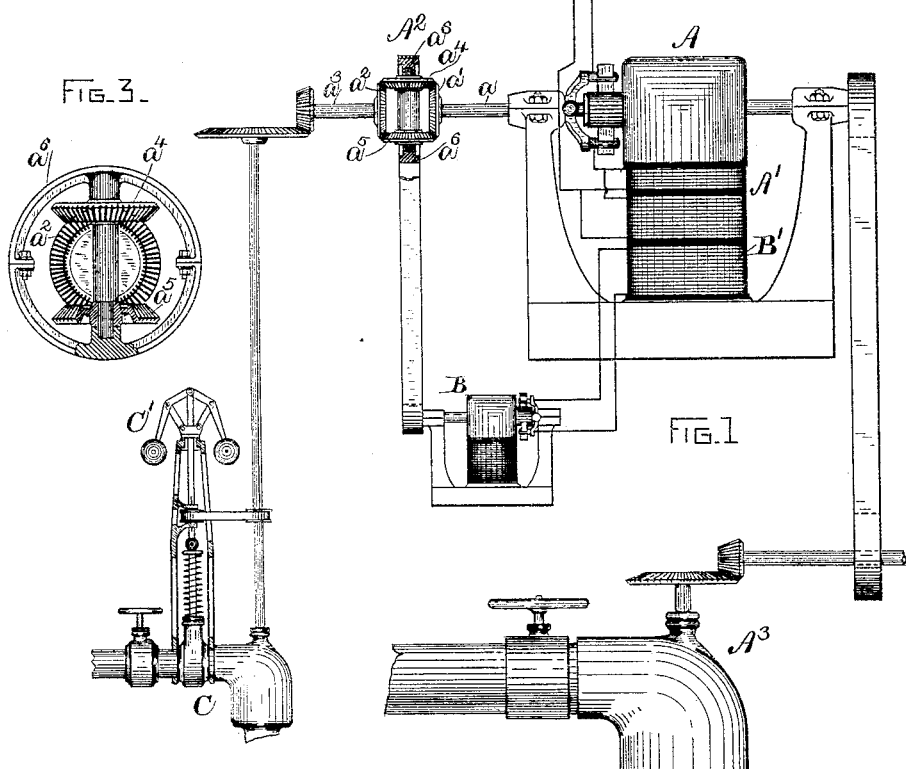
WITNESSES
Henry O. Westendarp
J. L. Livermore
INVENTOR
Louis Bell,
By Bentley & Blodgett,
Attys.

(No Model.) 2 Sheets—Sheet 2.
L. BELL.
REGULATOR FOR DYNAMO ELECTRIC MACHINES.
No. 532,861. Patented Jan. 22, 1895.
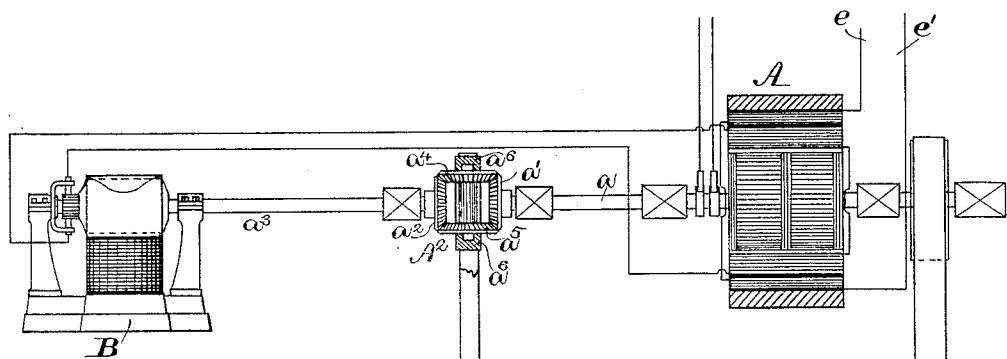
FIG. 2.
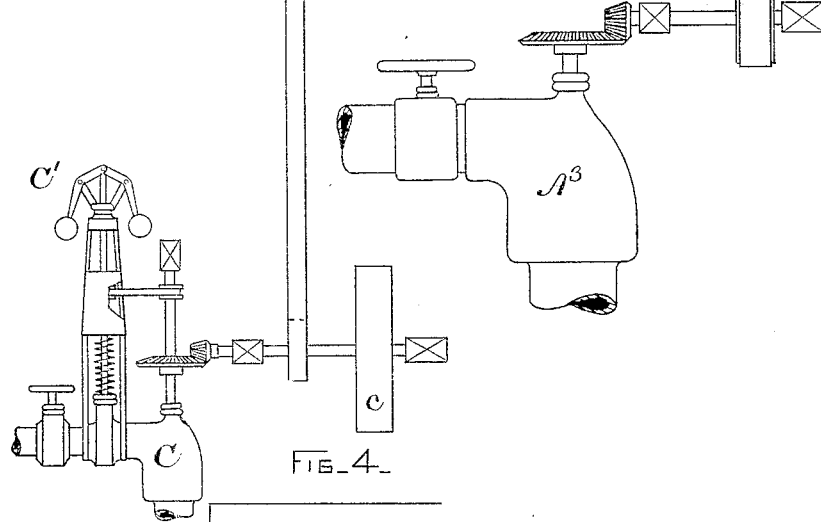
FIG. 4.
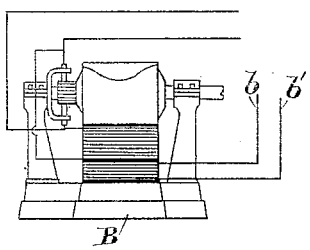
WITNESSES
A. F. Macdonald
H. H. McBride
INVENTOR
Louis Bell,
By Bentley & Blodgett
attys.

UNITED STATES PATENT OFFICE.

LOUIS BELL, OF BOSTON, MASSACHUSETTS, ASSIGNOR TO THE GENERAL ELECTRIC COMPANY, OF SAME PLACE.

REGULATOR FOR DYNAMO-ELECTRIC MACHINES.

SPECIFICATION forming part of Letters Patent No. 532,861, dated January 22, 1895.

Application filed December 18, 1893. Serial No. 493,926. (No model.)

*To all whom it may concern:*

Be it known that I, LOUIS BELL, a citizen of the United States, residing at Boston, county of Suffolk, and State of Massachusetts, have invented certain new and useful Improvements in Regulators for Dynamo-Electric Machines, of which the following is a specification.

My invention relates to dynamo electric machinery, and has for its object to provide a method of and means for regulating a generator of electric currents adapted to keep the potential of the generated current constant under variations in the speed of its armature due to defective regulation of the prime mover.

Various means for potential regulation under changes of load are known in the art, but such regulation is not responsive to changes of speed in the rotation of the armature. It is therefore necessary to maintain such speed constant, and this of course depends upon the speed regulator applied to the machine which drives the generator, commonly called the governor. In some cases, however, notably where water power is used, it is difficult to regulate or govern for constant speed, the reason being, in the case of water power for example, that the inertia of a large wheel is so great that its speed does not respond immediately to the action of devices controlling the supply of water. While the generator, therefore, may be wound, or otherwise adapted to compensate for changes in load provided the armature does not vary in speed, there is a new problem presented when it is not possible to entirely prevent such variation—that is to say, to obtain the best results additional means must be provided whereby the potential can be maintained constant when such speed variation exists, and such means are embodied in the apparatus herein described.

In carrying out my invention and putting it into practical use I provide a winding upon the field magnets of the generator to be regulated, and excite this winding by current from a separate source, such as a small exciter dynamo. By means of suitable gearing, or similar devices, the separate exciter dynamo is operated at a speed variable inversely to variations in the speed of the main armature; that is to say, the operation of the exciter is so controlled that a decrease in the speed at which the armature of the main generator rotates is met by a corresponding increase in the speed of the exciter armature, and vice versa, so that the variations in potential due to the speed variations of the main armature are compensated for by changing the field strength of the generator in the proper proportion. This regulator is preferably used in connection with means, such as compound winding, for regulating the potential under changes of load; but in cases where the load is practically constant, and the speed variation of the armature alone is to be compensated for, the entire field of the generator may be separately excited and the current exciting it varied as described.

In the accompanying drawings, Figure 1 is a diagram showing the main and exciter machines and the circuits therefrom. Fig. 2 is a modification showing the device differently arranged and applied to an alternating current generator. Fig. 3 is a detail showing the construction of a differential gear I may use, and Fig. 4 is a modification of the exciter.

Referring to the drawings, Fig. 1, the main generator A is belted to and operated by a suitable source of power, in this case a turbine water wheel $A^3$, and is connected in the ordinary way to a circuit X Y from which various translating devices may be supplied with current. Thus a circuit $X'$ $Y'$ is shown leading from said circuit X Y which may be used to supply incandescent lamps or other translating devices, and another circuit $X^2$ $Y^2$ is connected to a motor generator or transformer, from which by circuit $X^3$ $Y^3$ other translating devices such as railway motors may be also supplied with current. The fields of the said generator A are provided with an auxiliary winding $B'$ in addition to and independent of the main field winding $A'$ which may be compounded or otherwise arranged to compensate for changes of load. The auxiliary winding $B'$ is supplied with current from a separate dynamo electric machine B and said machine B is driven by a pulley operated by a differential gear $A^2$. This differential gear $A^2$ consists of a bevel-wheel $a'$ keyed or otherwise fastened to the end of the main armature shaft $a$, and a similar gear wheel $a^2$ opposite thereto upon an auxiliary shaft $a^3$ extending from the shaft $a$ in line therewith. These two gears mesh respectively with the two other gears $a^4$ $a^5$ at right angles thereto, having bearings in the pulley $a^6$ and moving therewith, as best shown in Fig. 3. By the use of such a gear, the action of which is well known and requires no detailed explanation, the pulley $a^6$ will be rotated at a rate of speed dependent upon the respective speeds of the main and auxiliary shafts, and its rate of speed be equal to half the sum of the number of revolutions of the two shafts respectively. It makes no difference, of course, whether the said two shafts rotate in the same or opposite directions, except that in the latter case the rate of speed of one shaft may be assumed to be a positive and of the other a negative quantity. If therefore, auxiliary shaft $a^3$ is rotated at say the rate of one thousand revolutions per minute, and the main shaft $a$ is rotated in the opposite direction at, say, five hundred revolutions, the resultant speed of pulley $a^6$ will be equal to half the sum of plus one thousand, minus five hundred, or two hundred and fifty revolutions in the direction of shaft $a^3$. In other words, the resultant rate of speed is equal to half the difference between the rates of the respective shafts when they rotate in opposite directions, and a decrease in the rate of one relative to that of the other, by increasing this difference, gives a higher resultant speed.

In the present instance, the device is used as follows: The gear wheel $a'$, which, as above described, is keyed to and forms a part of the armature shaft $a$, rotates in unison therewith, while the wheel $a^2$ which rotates with the auxiliary shaft $a^3$ is carried thereby in the opposite direction, by suitable means, at a constant speed higher than that of the armature shaft when at its maximum. The armature of the exciting machine B, which is belted to the pulley $a^6$, will therefore in accordance with the action of the gear above described rotate at a rate of speed equal to half the difference between the respective rates of speed of the main armature and the constant high speed shaft. Consequently, when an increase or decrease in the speed in the main armature causes an increase or decrease in potential upon the work circuit, the corresponding inverse change in the speed of the exciter, due to the gear above described, causes a change in the excitation of the field of the main generator, acting to increase the strength thereof as the armature loses speed, and vice versa.

In Fig. 2, the exciting machine B is directly driven by the auxiliary shaft $a^3$ which is connected, as before, by the gear $A^2$ to the main shaft $a$, while the pulley $a^6$ upon the said gear is belted to the small constant speed turbine wheel C which is preferably provided with a fly wheel $c$, to assist in maintaining the speed constant. The generator A in this case is an alternator provided with a separately energized winding supplied with current from the circuit $e$ $e'$, and the amount of current flowing in which is preferably varied automatically by any well known means in response to changes in load on the circuit fed by generator A. The separate exciter B, as is the case in Fig. 1, supplies current to a second independent winding on the field magnet of generator A, and the current thus supplied depends, as before, upon the speed of the exciter. In this arrangement, the shaft $a$, gear $A^2$ and the shaft $a^3$ all rotate normally at the same rate of speed and in the same direction, the gear wheels $a^4$ $a^5$ being stationary with relation to their axes, and simply acting to lock the two shafts together. Inasmuch, however, as the speed of pulley $a^6$ is maintained constant while through the action of the gear its speed must always be the average or mean between the respective speeds of the two shafts $a$, $a^3$, it is obvious that a variation in the speed of one of said shafts will be inversely imparted to the other—that is to say, a decrease in the speed of the armature of generator A will cause a corresponding increase in the speed of the exciter armature, or vice versa, thus effecting the desired regulation as hereinbefore described.

A further modification of the invention consists in applying the potential regulation to the exciter, as is shown in Fig. 4. In this case, the exciter B is provided with an auxiliary winding $b$, $b'$, leading to the circuit X Y (Fig. 1) thus variably exciting its field in proportion to changes in load on said circuit X Y. Thus the exciter connected to the armature shaft of the main generator as hereinbefore described, responds in its output to changes in load upon the circuit supplied with current by the main generator as well as to changes in the driving-speed of said generator. In this case, therefore, it is possible to excite the field magnets of the main generator entirely by current from the exciter B instead of partially as above described, while the desired regulation is effected under all conditions of operation.

While the constant speed motor C is represented in the drawings as a small turbine wheel provided with a ball governor C', and preferably having a fly wheel $c$, as shown in Fig. 2, such means affording efficient speed regulation in a small machine where the inertia is slight, it is obvious that any other constant speed device could be used, such as a small electric motor properly arranged to maintain its speed at the desired rate. It is only necessary that a constant speed be attained at a rate determined by the conditions under which the regulator is to operate.

It is not essential, either, that the differential gear should be directly connected to or integral with the armature shaft of the main dynamo, although it is so shown for convenience. In practice it would probably be found better to mount the gear in separate bearings and belt or otherwise connect the proper members thereof respectively to the armature shaft, constant speed motor and exciter. The pulleys or connections may be so arranged that the driving relations of the parts suit the conditions under which the device is to operate, it being necessary only to so arrange the parts that the proper differential effect is obtained.

I do not intend to limit myself to the exact mechanical construction herein shown and described, since various expedients might be suggested for automatically varying the speed of a separate exciter dynamo inversely with variations in the speed at which the main dynamo is driven. The exciter might, for example, be geared to the shaft of the turbine-wheel or other driver, instead of to the armature shaft of the generator, and any known form of differential gearing which will give the desired inverse effect may be employed.

What I claim as new, and desire to secure by Letters Patent, is—

1. The method of regulating a dynamo-electric machine provided with a separate source of current exciting its field-magnets, which consists in varying the speed of the separate exciter inversely to the variations of speed of the armature in the dynamo-electric machine, substantially as set out herein.

2. The method of regulating a dynamo-electric machine provided with a compound winding adapted to compensate for variations of potential under changes of load and with a separate source of current for exciting its field-magnets, which consists in varying the potential of the exciting current in inverse proportion to any change in speed of the armature of the main generator by changing the armature speed of the separate source of current.

3. The method of regulating a dynamo-electric machine provided with a compound winding adapted to compensate for variations of potential under changes of load and with a separate source of exciting current for its field-magnets, which consists in varying the speed of the armature of the separate source of excitation in inverse proportion to the variations of speed in the armature of the main generator, substantially as set out herein and described.

4. The method of regulating a dynamo-electric machine having a separate exciter, which consists in causing the variations of speed in the armature of the main machine to effect an inverse variation of speed in the exciter, substantially as described.

5. The combination, in a dynamo electric machine, of a variable speed driver for the same, a separate constant speed driver, and means for varying the field strength of said dynamo electric machine responsive to the difference of effect between said drivers, as set forth.

6. A regulator for dynamo electric machines, comprising in connection with the main armature shaft a gear driven at a substantially constant speed, and a separate exciter for the field magnets of said dynamo electric machine driven by said shaft and gear at a speed dependent upon the difference between the respective speeds thereof, as set forth.

7. The combination with a dynamo electric machine having a driver of variable speed and ample power, of a second driver having little power and substantially constant speed, and a device automatically responsive to the difference between the respective rates of speed of said drivers, for increasing or decreasing the field-strength of such a dynamo electric machine in inverse ratio to the increase or decrease in speed of said driver thereof as set forth.

8. The combination with a dynamo electric machine regulated to give substantially constant potential under changes of load, of an auxiliary field winding independent of the main field winding, and means for varying the magnetic effect thereof in response to variations in speed of the armature of said machine, as set forth.

9. The combination, in a generator of electric currents with a main field winding adapted to maintain the potential constant under changes of load, of an auxiliary winding independent thereof, and variably energized in response to variations in the armature speed of said generator, as set forth.

10. The combination with a generator of electric currents having a field winding adapted to maintain the line potential constant under variations of load, of means, substantially as described, for maintaining the line potential constant under variations in the power driving said generator, as set forth.

11. The combination, in a generator of electric currents, with a separately energized field winding dependent in its effect upon variations in load upon the circuit supplied with current by said generator, of a second separately energized field winding independent thereof, and means for varying the effect of said second field winding in response to variations in the speed of the rotating member of said generator, as set forth.

12. The combination with a generator of electric currents driven by variable power at variable speed, of a smaller generator driven at substantially constant speed, and connected to the shaft of the main generator by a differential gear adapted to vary the speed of the smaller generator inversely to the variations of speed in the main generator, as set out.

In witness whereof I hereunto set my hand this 14th day of December, 1893.

LOUIS BELL.

Witnesses:
A. A. McBRIDE,
A. O. ORNE.